Figure 1:
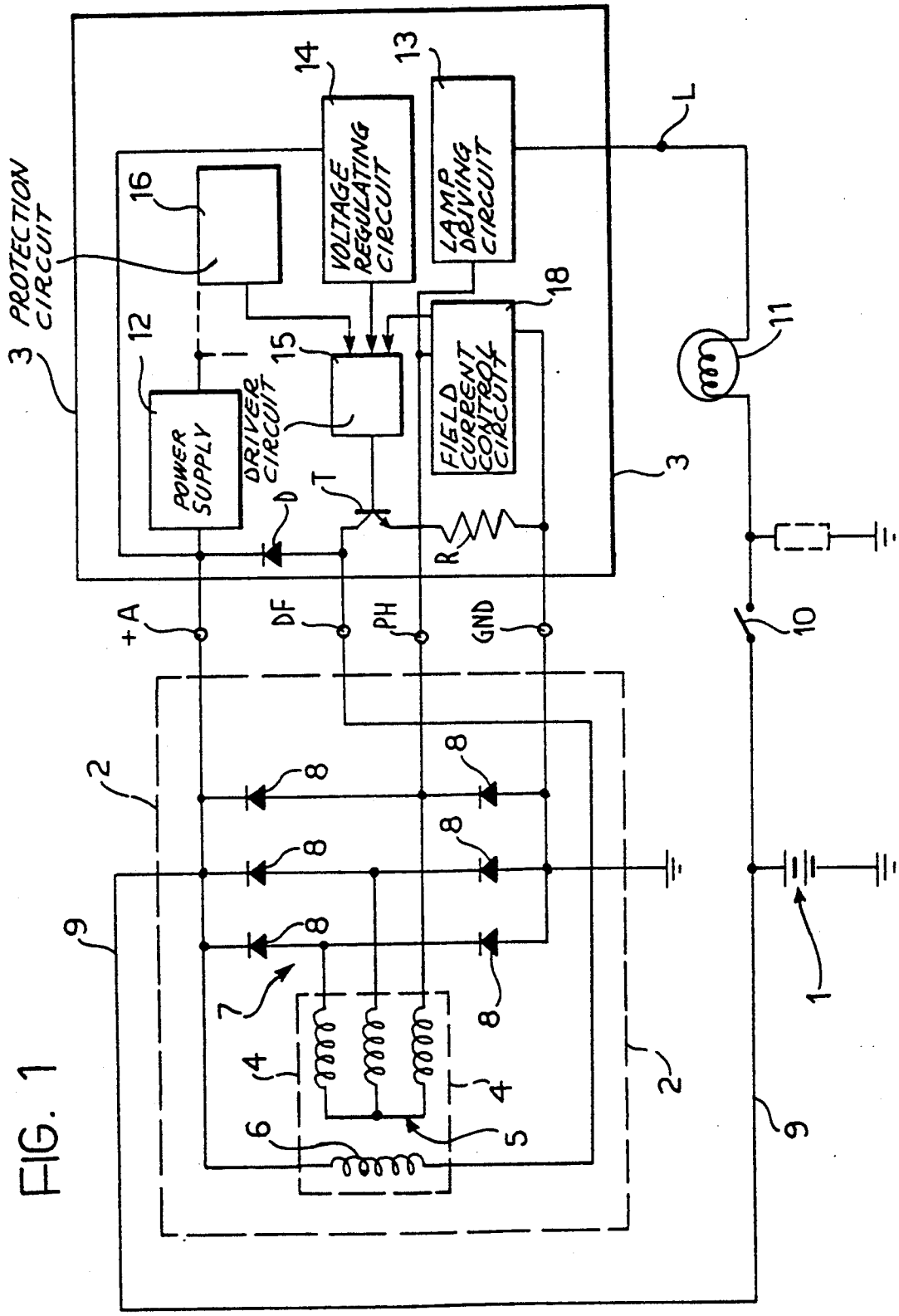

United States Patent [19]

Vercesi et al.

[11] Patent Number: 5,254,935
[45] Date of Patent: Oct. 19, 1993

[54] MONITORING CIRCUIT FOR A SYSTEM FOR RECHARGING A MOTOR VEHICLE BATTERY

[75] Inventors: Roberto Vercesi, Turin; Marcello Boella, Ivrea, both of Italy

[73] Assignee: Marelli Autronica S.p.A., Milan, Italy

[21] Appl. No.: 868,046

[22] Filed: Apr. 13, 1992

[30] Foreign Application Priority Data

Apr. 22, 1991 [IT] Italy .................. TO91A000305

[51] Int. Cl.⁵ .............................................. H02J 7/14
[52] U.S. Cl. ........................................ 322/29; 322/28; 322/99; 320/64
[58] Field of Search .................. 322/28, 29, 32, 72, 322/73, 99, 23; 320/61, 64, 68

[56] References Cited

U.S. PATENT DOCUMENTS

| | | | |
|---|---|---|---|
| 4,024,456 | 5/1977 | Sato et al. | 322/29 |
| 4,477,766 | 10/1984 | Akita et al. | 322/28 |
| 4,629,968 | 12/1986 | Butts et al. | 322/29 |
| 4,636,706 | 1/1987 | Bowman et al. | 322/29 X |
| 5,061,889 | 10/1991 | Iwatani et al. | 322/29 X |
| 5,132,608 | 7/1992 | Boella et al. | 322/99 |

FOREIGN PATENT DOCUMENTS

| | | |
|---|---|---|
| 0116482 | 8/1984 | European Pat. Off. . |
| 0289608 | 11/1988 | European Pat. Off. . |
| 0330561 | 8/1989 | European Pat. Off. . |
| 0448065 | 9/1991 | European Pat. Off. . |
| 0483081 | 4/1992 | European Pat. Off. . |
| 3722762 | 1/1988 | Fed. Rep. of Germany . |
| 2555834 | 5/1985 | France . |
| 2164508 | 3/1986 | United Kingdom . |
| 88/01110 | 2/1988 | World Int. Prop. O. . |

Primary Examiner—Kristine L. Peckman
Attorney, Agent, or Firm—Fish & Richardson

[57] ABSTRACT

A monitoring circuit for an electrical generator for recharging a motor vehicle battery. The monitoring circuit includes a driver transistor, a field coil current sensor, and driver circuit. The collector-emitter path of the driver transistor is connected in series to the field coil of the generator and a direct current voltage source. The field coil current sensor provides a signal indicative of the current flowing in the field coil. The driver circuit drives the transistor as a function of the voltage produced by the generator and the signal provided by the field coil current sensor. The driver circuit includes a detector circuit and a processing and comparison circuit. The detector circuit is connected to a phase of the generator and provides a signal indicative of the generator's rotation speed. The processing and comparison circuit is coupled to the detector circuit and generates a signal for controlling the conduction of current through the transistor so that the intensity of the current flowing through the collector-emitter path of the transistor varies as a function of the generator's rotation speed.

8 Claims, 5 Drawing Sheets

MONITORING CIRCUIT FOR A SYSTEM FOR RECHARGING A MOTOR VEHICLE BATTERY

DESCRIPTION

The present invention relates to a monitoring circuit for a motor vehicle battery recharging system which comprises a rotary electric generator including an alternator with an induction coil and a field coil and a rectifier the output of which is connected to the battery.

In general, the invention features a monitoring circuit for an electrical generator for charging a motor vehicle battery. The monitoring circuit includes a driver transistor, a field coil current sensor and driver circuit. The collector-emitter path of the driver transistor is connected in series to the field coil of the generator and a direct current voltage source. The field coil current sensor provides a signal indicative of the current flowing in the field coil. The driver circuit drives the transistor as a function of the voltage produced by the generator and the signal provided by the field coil current sensor. The driver circuit includes a detector circuit and a processing and comparison circuit. The detector circuit is connected to a phase of the generator and provides a signal indicative of the generator's rotation speed. The processing and comparison circuit is coupled to the detector circuit and generates a signal for controlling the conduction of current through the transistor so that the intensity of the current flowing through the collector-emitter path of the transistor varies as a function of the generator's rotation speed.

More specifically, in accordance with a further characteristic feature of the invention, the processing and comparison circuit is arranged to generate a signal for controlling the conduction through the transistor in such a way that the transistor is driven in a first mode which, when functioning, corresponds to a predetermined low value of current in the field coil when the rotary speed of the generator is below a preset level and in a second mode corresponding to a preset upper mean value of the current when the speed of rotation of the generator is greater than the preset level.

The monitoring circuit according to the invention makes it possible in particular to avoid a high absorption of current when the motor vehicle is stationary or when the engine of the motor vehicle is switched off.

Figure 2:
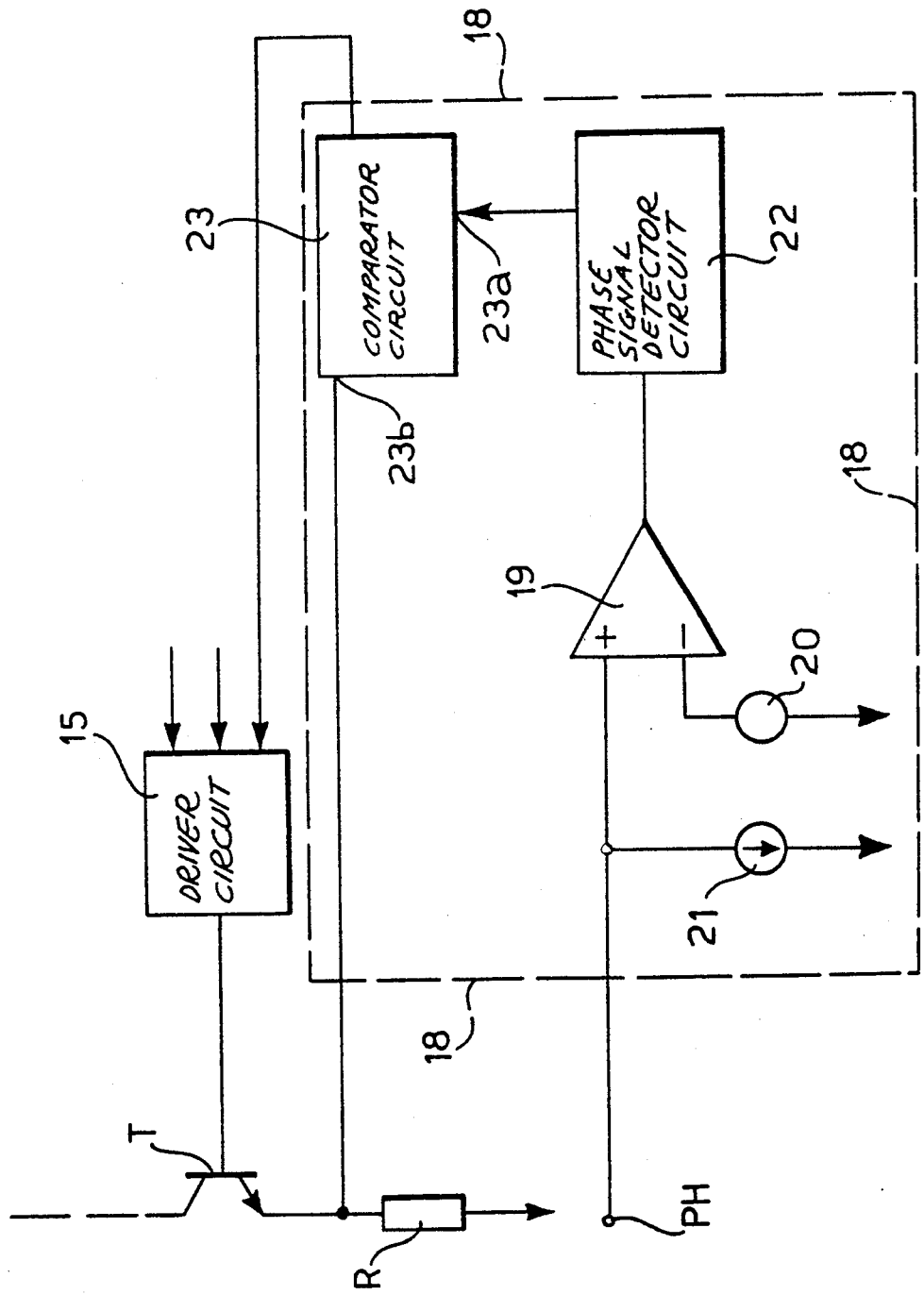
Figure 3:
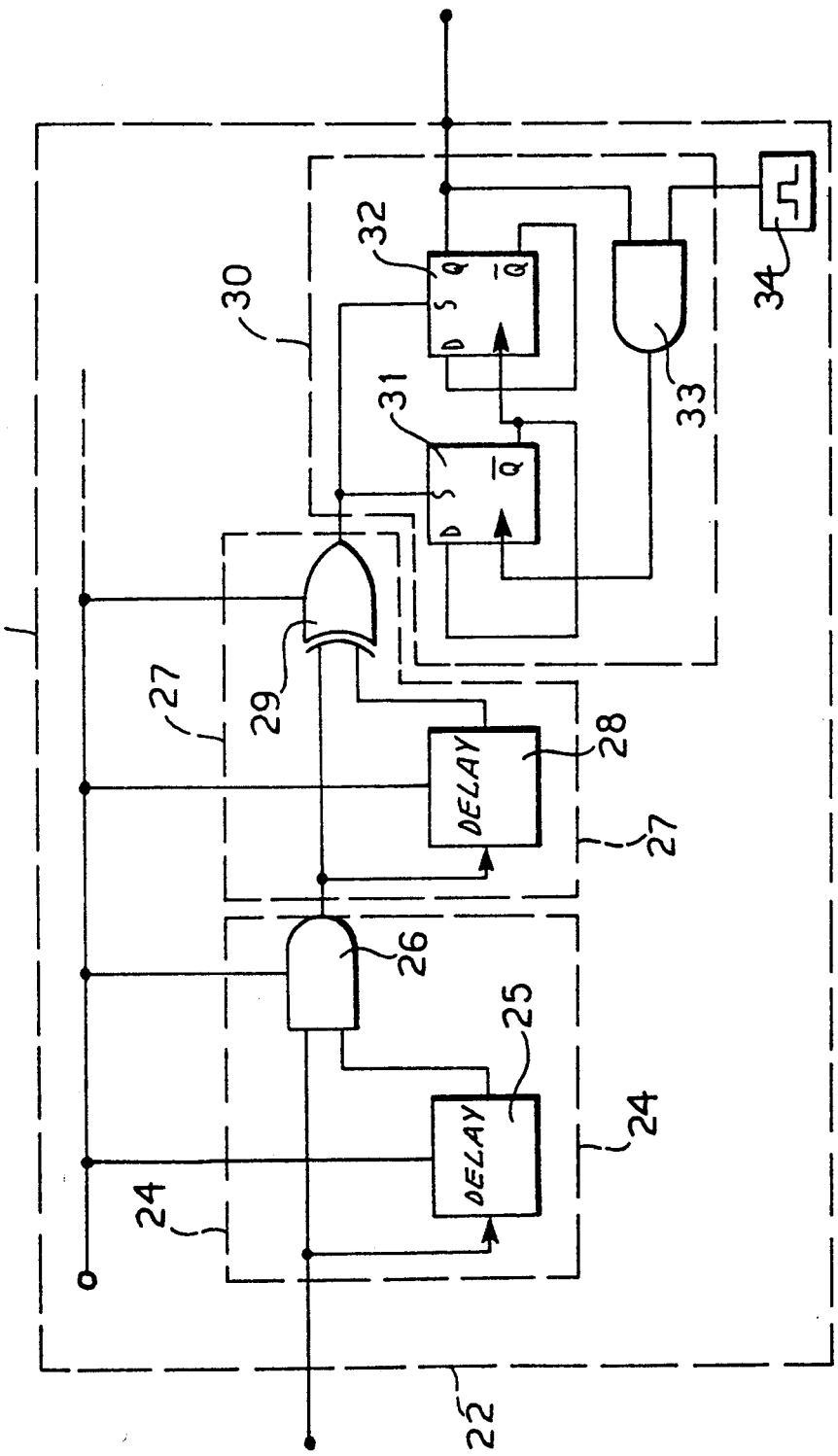
Figure 4:
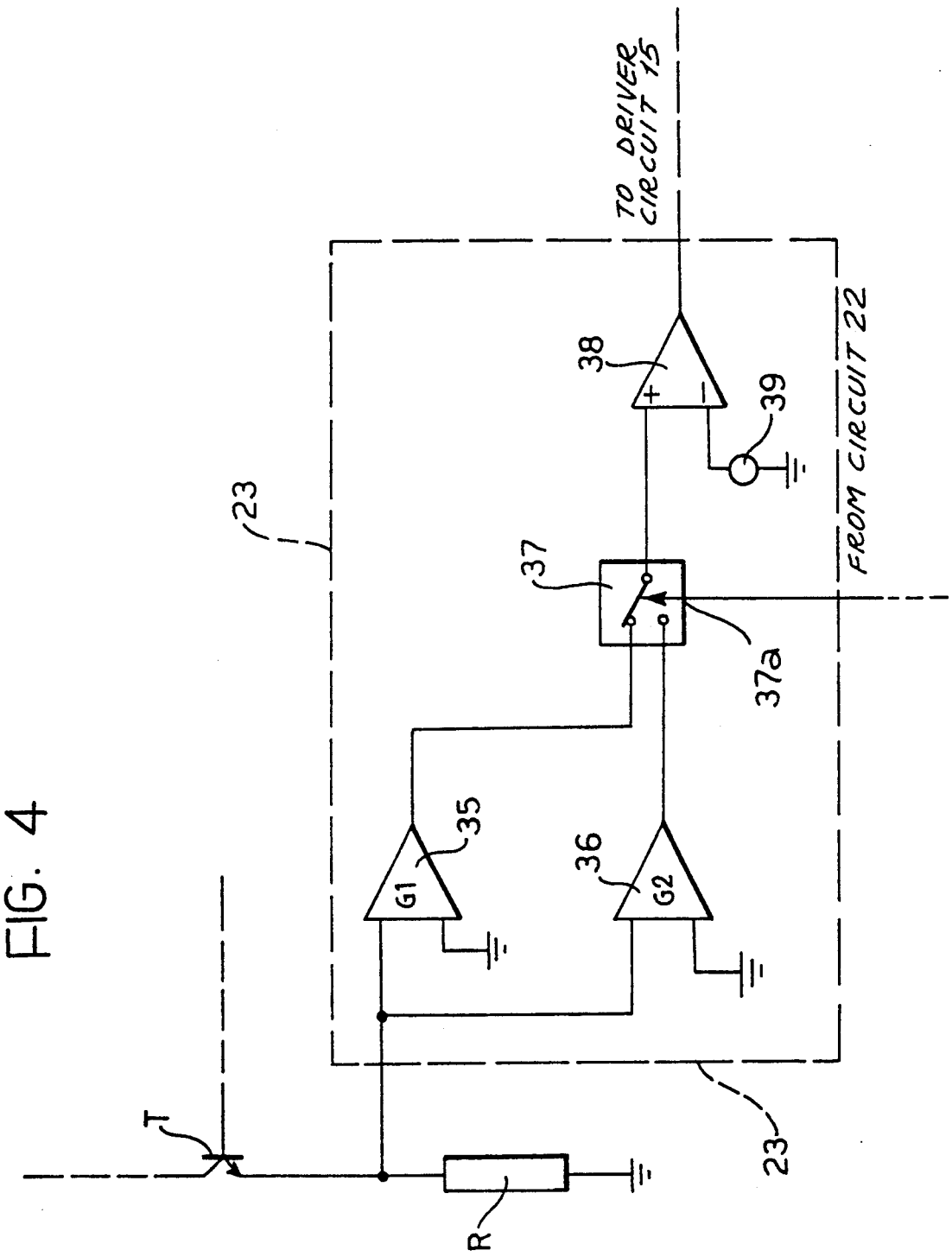
Figure 5:
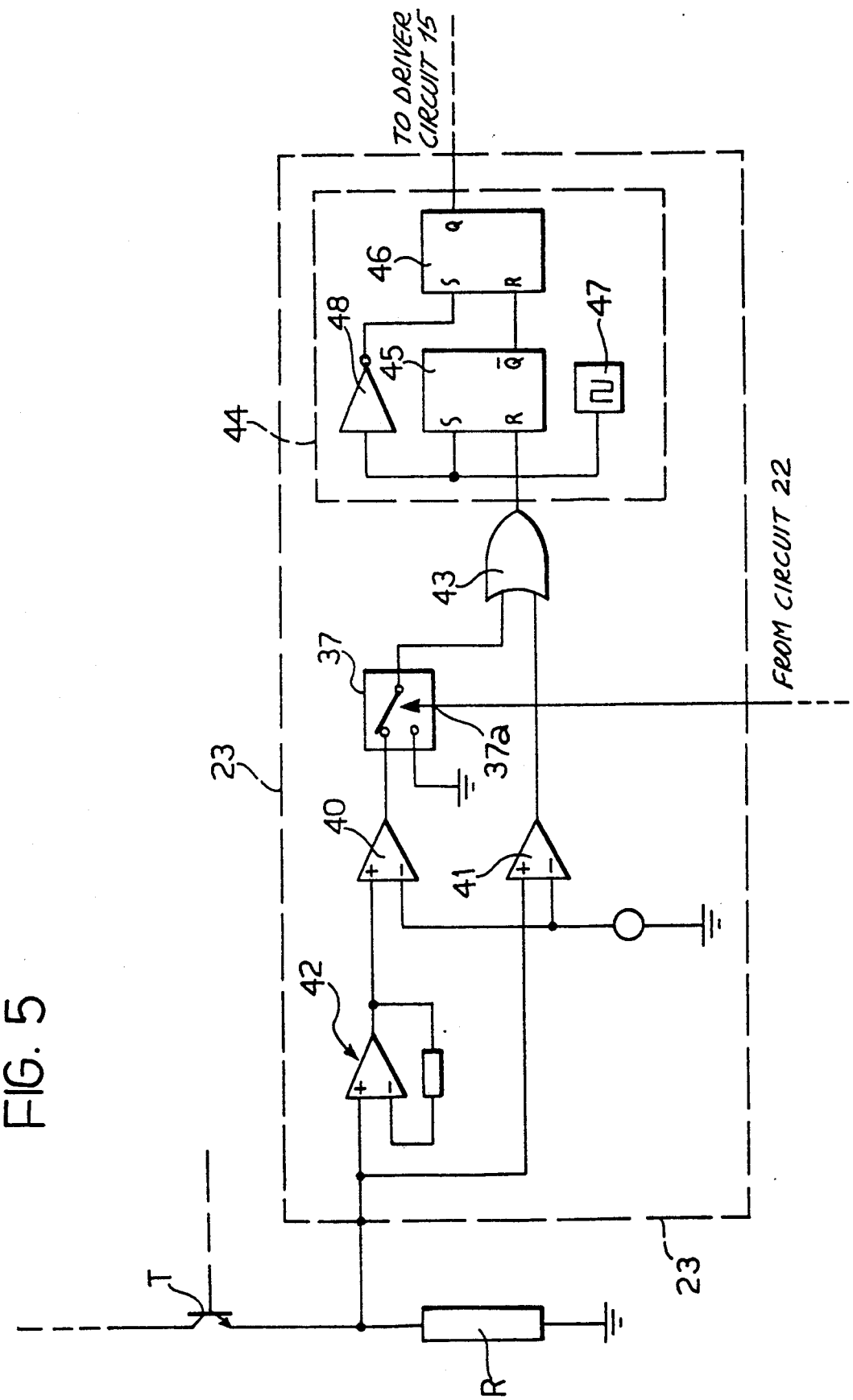

Further characteristic features and advantages of the invention will emerge from the following detailed description given with reference to the attached draw which are provided solely by way of non-limiting example and in which:

FIG. 1 is a diagram showing a system for recharging the battery of a motor vehicle, comprising a monitoring circuit according to the invention, FIG. 2 is a block circuit diagram showing the monitoring circuit according to the invention, FIG. 3 is a diagram of an embodiment of a detector circuit contained within the monitoring circuit according to the invention, and FIGS. 4 and 5 show two embodiments of a processing and comparison circuit comprised within the control circuit according to the invention.

With reference to FIG. 1, for recharging the battery 1 of a motor vehicle, a system is employed which comprises a current generator 2 and a monitoring circuit generally designated 3 and preferably constructed as an integrated circuit.

The generator 2 comprises an alternator 4 with a three-phase induction coil 5 (in the example illustrated, this has a star connection) and a field coil 6.

The induction coil 5 of the alternator is connected to a three-phase rectifier 7 of the full-wave type, produced using semi-conductor diodes 8.

The output from the rectifier 7 which constitutes the output from the generator 2 as a whole is connected to one terminal of the battery 1 through a connecting lead 9.

A switch 10 is connected to the positive terminal of the battery 1 and adapted to be actuated manually, for example by a key. Switch 10 may for example be incorporated into the ignition and starter selector switch of the vehicle.

Connected to the switch 10 is a terminal of a warning light 11, the other terminal of which is connected to an input L of the monitoring circuit 3.

The warning light 11 is illuminated when, with the switch 10 closed, the generator 2 is not generating current.

The control circuit 3 comprises a voltage supply 12 and has a further four terminals indicated as A, DF, PH and GND respectively.

Terminal A is connected to the output of the generator 2 and an input of the supply 12.

Terminal DF is connected to one end of the field coil 6, the other end of the coil being connected to the output of the generator 2.

Terminal PH is connected to a phase of the induction coil 5 of the alternator 4.

Finally, terminal GND is connected to the ground terminal of the rectifier circuit 7.

The control circuit comprises a driver circuit 13 for the light 11 and has its input connected to the terminal PH and therefore to a phase of the alternator 4.

In operation, when the switch 10 is closed and the alternator 2 is shut down, the circuit 13 causes illumination of the light 11.

As soon as the alternator 4 is actuated and the signal at the input PH exceeds the threshold of a comparator circuit within the driver circuit 13, the latter extinguishes the light 11.

The control circuit 3 also comprises a voltage regulator circuit 14 with an input connected to the terminal A and therefore to the output from the generator and with the output connected to a driver circuit 15. Driver circuit 15 is connected at its output to the base of a transistor T consisting, for instance, of a Darlington transistor.

The transistor T has its collector connected to the terminal DF and its emitter connected to ground through a resistor R. The collector-emitter path of the transistor T is therefore in series with the resistor R and the field coil 6, between the output from the generator 2 and earth.

D indicates a diode connected between terminals A and DF of the monitoring circuit 3. Diode D is therefore in parallel with the field coil 6.

Also connected to the driver circuit 15 are protection circuits 16 intended to cut off the transistor T if there is an excessive rise in temperature or in the event of an electrical overload.

The monitoring circuit 3 further comprises a circuit 18 for controlling the rotor field current. Circuit 18 has an input connected to the emitter of the transistor T and has another input connected to the terminal PH and therefore to a phase of the induction coil 5 of the generator 2.

The output of the circuit 18 is connected to a further input of the driver circuit 15.

As FIG. 2 shows, the circuit 18 comprises a threshold comparator 19 with the reversing input connected to a reference DC voltage source 20, and a non-inverting input connected to the terminal PH and therefore to a phase of the field coil 5 of the generator 2.

Between the non-inverting input of the comparator 19 and ground there is a current source 21 consisting, for instance, of a current generator producing power at around 1 mA and intended to neutralise the effect of any leakage currents from the diodes 8 of the rectifier bridge 7.

The output from the threshold comparator 19 is connected to the input of a phase signal detector circuit generally designated 22. Phase signal detector circuit 22 is arranged to provide at its output a logic signal which assumes, for example, the level "0" when the rotor of the generator 2 is stopped or is rotating very slowly (at a speed less than a predetermined minimum threshold) and the level "1" when, on the other hand, the rotor of the generator 2 is rotating at a speed greater than the threshold.

An exemplifying embodiment of the phase signal detector circuit 22 is illustrated in FIG. 3 and will be described in greater detail hereinafter.

Returning to FIG. 2, the output from the phase signal detector circuit 22 is connected to a first input 23a of a processing and comparison circuit 23. The said circuit has a further input 23b connected to the terminal of the resistor R which is connected to the emitter of the transistor T.

The output from the comparison circuit 23 constitutes the output of the entire circuit 18 and it is connected to an input of the driver circuit 15.

As will become more clearly apparent hereinafter, the processing and comparison circuit 23 is arranged to condition the conduction of current through the transistor T in such a way that the strength of the current flowing through the field coil is varied according to the speed of rotation of the rotor of the generator 2. In particular, the comparison circuit 23, through the driver circuit 15, controls the conduction of current through the transistor T in such a way that the said transistor is driven in a first mode which corresponds to fairly low peak levels of field current, for example between 300 to 500 mA, when the phase signal applied to the input PH of the monitoring circuit 3 indicates that the speed of rotation of the rotor of the generator or less than a minimum preset threshold and in a second mode which corresponds to peak values of the field current which are on average higher, for example between 4.75 and 5.25 A, when the phase signal indicates that the speed of rotation of the rotor of the generator is greater than the above-mentioned preset threshold and therefore the generator is effectively operating.

The processing and comparison circuit 23 drives the transistor T in the aforesaid first mode when the signal provided at the output from the detector circuit of the phase signal 22 is at level "0", and in the second mode when the said signal is at level "1".

In the embodiment shown in FIG. 3, the detector phase circuit 22 comprises a low-pass filtering circuit 24 which serves to eliminate the full switching stages present in the input signal due to switching of the power transistor T.

The filtering circuit 24 in the embodiment shown comprises a delay circuit 25 connected between the output of the threshold comparator 19 and a first input of a logic AND gate 26. The circuit 25 for example introduces a delay of 20 microseconds.

The other input of the AND gate 26 is connected to the output from the comparator circuit 19.

Connected to the output from the filtering circuit 24 is a logic circuit 27 for detecting leading and trailing edges of the signal applied to its input. The circuit comprises a delay circuit 28, the input of which is connected to the output from the AND gate 26, and the output of which is connected to a first input of an EXOR 29, the other input of which is connected to the output form the AND gate 26. The circuit 28 introduces, for instance, a delay of 20 microseconds. Correspondingly, in the operation at the output form the EXOR gate 29 there is a train of pulses with a pulse of 20 microseconds duration for each leading and trailing edge presented by the signal at the output from the AND gate 26.

The output from the circuit 27 is connected to the input of a control circuit 30 comprising two bistable circuits (flip-flop, type D) 31 and 32 and a logic AND gate 33, connected in the manner illustrated. Connected to an input of the AND gate 33 is the output from an oscillator 34 which has a frequency of 80 Hz for example.

In operation, when the control circuit 30 receives a first pulse from the logic circuit 27, the output Q from the bistable circuit 32 moves to high level ("1") and remains in that state if every subsequent input pulse occurs at the latest within a time equal (in the example illustrated in FIG. 3) to twice the cycle of the oscillator 34. When the interval between two successive pulses received at the input of the circuit 30 is greater than two cycles of the oscillator 34, the output Q from the flip-flop 32 passes to level "0". In practice, this situation occurs when the rotor of the generator 2 is stopped or is rotating fairly slowly, at a speed below the predetermined threshold.

With reference to FIG. 4, in a first embodiment, the processing and comparison circuit 23 comprises two amplifiers 35 and 36 which have respective and different gain values G1 and G2, connected on the input side to the emitter of the transistor T. The outputs from the amplifiers are connected to the inputs of a switching device 37 having a further control input 37a connected to the output from the phase signal detector circuit 22. The output from the selective switching device is connected to an input of a threshold comparator circuit 38. The other input of the threshold comparator is connected to a direct current reference voltage source 39.

If the amplifier 35 has a greater gain than the amplifier 36 when the signal supplied at the output from the circuit 22 at level "0" and at level "1" respectively, the switching device 37 selectively couples to the input of the threshold comparator 38 the output of the amplifier 35 or, respectively, the output of the amplifier 36. Therefore, when the generator 2 is stopped or is turning at an extremely low speed, the threshold comparator, with hysteresis 38, compares with its reference levels a field current indicator signal, the signal being greatly amplified in respect of the situation in which the generator 2 is operating. This is equivalent to comparing the field current with the very lowest thresholds and with a narrower hysteresis beam when the generator is stopped or almost stopped. Consequently, the driving signal which passes from the output of the comparator 38 to the base of the transistor T through the circuit 15 is such that it reduces the conduction time of the transistor and therefore maintains the mean value of the peak current in its collector-emitter path within a preset range, for example between 300 and 500 mA as stated hereinabove.

When the generator 2 is functioning at a speed greater than the minimum preset threshold, the comparator 38 compares its thresholds and its hysteresis band with a relatively less amplified signal. This is equivalent to comparing the field current with greater thresholds and a wider hysteresis band than in the situation where the generator is stopped or almost stopped. Consequently, the comparator 38 keeps the transistor T conductive for longer times and consequently the peak intensity of the field current may vary within clearly greater limits than in the preceding case, for example between 4.74 and 5.25 A, as stated hereinabove.

In the processing and comparison circuit 23 shown in FIG. 4, the amplifier 36 could at the limit, be omitted and the corresponding input of the selective switching device 37 could be connected directly to the emitter of the transistor T.

Shown in FIG. 5 is an alternative embodiment of comparison circuit 23. In the alternative, connected to the emitter of the transistor T are two threshold comparator circuits 40 and 41 having the same threshold levels and the same band of hysteresis. The comparator 40 is connected to the emitter of the transistor T through an interposed amplifier circuit 42 having for example a gain G equal to 10. The comparator 41 is however connected directly to the emitter of transistor T.

The outputs from the threshold comparators 40 and 41 are connected to corresponding inputs of an OR circuit 43 through a switching device 37 and directly, respectively. The switching device 37 is also controlled by the output from the circuit 22. In particular when the signal supplied at the output from the circuit 22 is at level "0" (generator stopped or below the threshold rotation rate), the device 37 couples a first input of the OR gate 43 to the output from the threshold comparator 40. On the other hand, when the signal supplied by the circuit 22 is at level "1" (generator running), the device 37 couples the input of the OR gate 43 to earth.

The output from the OR gate 43 is connected to the input of a driver circuit 44 of the chopper type comprising two bistable circuits (flip-flop of the set/reset type) 45 and 46, connected in the manner illustrated and an oscillator 47, the output from which is connected to the set inputs of the circuits 45 and 46 directly and through an inverter 48, respectively.

The output from the OR gate is connected to the reset input R of the bistable circuit 45.

The output Q from the bistable circuit 46 represents the output from the driver circuit 44 as a whole.

When, in operation, the generator 2 is stopped or almost stopped, the output from the comparator 41 is maintained constantly at level "0", and therefore the chopper control circuit 44 is driven, by the output from the threshold comparator 40, through the selective switching device 37 and the OR gate 43.

On the other hand, when the generator 2 is functioning properly, the switching device 37 disconnects the output from the comparator 40 of the chopper control circuit 44, which is driven by the output from the threshold comparator 41.

In either case, the circuit 44 is "set" by the signal form the clock 47 (the frequency of which is 640 Hz for example) and it is then "reset" by the signal provided by the comparator 40 or by the comparator 41 when the field current exceeds the threshold.

By an appropriate selection of the gain of the amplifier 44 and of the reference voltage associated with the comparators 40 and 41, it is possible to ensure that the transistor T is so driven that it maintains the peak current in its collector-emitter path at an average of between 300 and 500 mA for example when the alternator is stopped or almost stopped and between 4.75 and 5.25 A for example when the alternator is operating.

Naturally, while the principle of the invention remains established, the embodiments and details of implementation may be varied widely compared with what has been described and illustrated purely by way of non-limiting example, without thereby departing from the scope of the present invention.

What is claimed is:

1. A monitoring circuit for a motor vehicle battery recharging system which comprises an electrical generator with an induction coil and a field coil, output of the generator being connected to terminals of a battery; the monitoring circuit comprising a driver transistor having a collector-emitter path connected in series to the field coil of the generator and a direct current voltage source, field coil current sensor means for providing a signal indicative of current flowing during operation in the field coil, and driver circuit means for driving said transistor as a function of voltage produced by the generator and the signal provided by said field coil current sensor means, said driver circuit means comprising a detector circuit connected to a phase of the generator for providing a signal indicative of rotary speed of the generator, and a processing and comparison circuit coupled to said detector circuit for generating a signal for controlling conduction of current through said transistor so that current intensity flowing through the collector-emitter path of said transistor varies as a function of the rotary speed of the generator.

2. A monitoring circuit according to claim 1, wherein said processing and comparison circuit is configured to generate the signal for controlling conduction of current through said transistor in a first mode and a second mode, in said first mode, the average peak current through said collector-emitter path and in said field coil being limited below a predetermined low value when the rotary speed of the generator is below a preset level and, in said second mode, the average peak current through said collector-emitter path and in said field coil being allowed to reach values higher than said predetermined low value when the rotary speed of the generator is above said preset level, thereby avoiding a high current draw when a motor vehicle is stationary or the generator is switched off.

3. A monitoring circuit according to claim 2, wherein said detector circuit comprises a first threshold comparator circuit with a first input connected to the phase of the generator and a second input connected to a first reference direct current voltage source;

a logic circuit connected to an output of said first threshold comparator circuit for generation of a pulse corresponding to each leading and/or trailing edge of an output signal from said first threshold comparator circuit; and an actuating circuit connected to said logic circuit for providing a first or a second logic actuating signal based on the interval of time between two successive pulses provided by said logic circuit in relation to a preset value.

4. A monitoring circuit according to claim 3, further comprising a current source connected to said first input of the first threshold comparator circuit for neutralizing the effect of any leakage currents from a rectifier of the generator.

5. A monitoring circuit according to claim 3, further comprising a low-pass filtering circuit interposed between the first comparator circuit and said logic circuit.

6. A monitoring circuit according to claim 3, in which said field coil current sensing means comprises a resistor disposed in series with the collector-emitter path of said transistor, wherein said processing and comparison circuit comprises first and second amplifiers with different gains and inputs connected to said resistor;

a second threshold comparator circuit connected to a second reference direct current voltage source; and a switching device interposed between outputs of said amplifiers and an input of said second threshold comparator circuit and having an actuating input coupled to an output from said detector circuit so that, when said detector circuit emits said first actuating signal or said second actuating signal, said switching device selectively couples an output from said first amplifier or said second amplifier to said input of said second threshold comparator circuit.

7. A monitoring circuit according to claim 3 in which said field coil current sensing means comprises a resistor in series with the collector-emitter path of said transistor; and said processing and comparison circuit comprises an amplifier connected said resistor, second and third threshold comparator circuits associated with a direct-current reference voltage source an input of said second comparator circuit being connected to an output from said amplifier and an input of said third threshold comparator circuit being connected to said resistor, a chopper-type driver circuit for influencing the conduction of current through said transistor, and a switching device which controls a connection between an output from at least one of said second threshold comparator and said third threshold comparator and an actuating input of said chopper-driver circuit.

8. A monitoring circuit according to claim 7, further comprising low-pass filtering means associated with said second and third threshold comparators for neutralizing any stray pulses due to selective switching of said transistor.

* * * * *

UNITED STATES PATENT AND TRADEMARK OFFICE
CERTIFICATE OF CORRECTION

PATENT NO.   : 5,254,935

DATED        : October 19, 1993

INVENTOR(S)  : Robert Vercesi et al.

It is certified that error appears in the above-identified patent and that said Letters Patent is hereby corrected as shown below:

Column 1, line 52, delete "draw" and insert therefor -- drawings --;

Column 2, line 7, delete "full-wave" and insert therefor -- double semi-wave --;

Column 2, line 27, delete "of" and insert therefor -- from --;

Column 2, line 58, delete "earth" and insert therefor -- ground --;

Column 2, line 59, before "diode" insert -- flyback -;

Column 2, line 62, delete "protection" and insert therefor -- protective --;

Column 3, line 53, delete "or";

Column 3, line 67, before "dectector" insert -- phase --.

UNITED STATES PATENT AND TRADEMARK OFFICE
CERTIFICATE OF CORRECTION

PATENT NO. : 5,254,935

DATED : October 19, 1993

INVENTOR(S) : Robert Vercesi et al.

It is certified that error appears in the above-identified patent and that said Letters Patent is hereby corrected as shown below:

Column 3, line 68, delete "phase".

Claim 7, column 8, line 17, after "source" insert -- , --.

Signed and Sealed this

Twelfth Day of July, 1994

Attest:

BRUCE LEHMAN

Attesting Officer     Commissioner of Patents and Trademarks